(12) United States Patent
Abdoli et al.

(10) Patent No.: US 9,571,232 B2
(45) Date of Patent: Feb. 14, 2017

(54) SYSTEM AND METHOD FOR FASTER THAN NYQUIST TRANSMISSION

(71) Applicant: Huawei Technologies Co., Ltd., Shenzhen (CN)

(72) Inventors: Javad Abdoli, Kanata (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 14/212,735

(22) Filed: Mar. 14, 2014

(65) Prior Publication Data
US 2015/0263822 A1 Sep. 17, 2015

(51) Int. Cl.
| | |
|---|---|
| H04W 4/00 | (2009.01) |
| H04L 1/00 | (2006.01) |
| H04L 1/20 | (2006.01) |
| H04L 25/03 | (2006.01) |
| H04J 11/00 | (2006.01) |

(52) U.S. Cl.
CPC ............ *H04L 1/006* (2013.01); *H04J 11/00* (2013.01); *H04L 1/0047* (2013.01); *H04L 1/0052* (2013.01); *H04L 1/0054* (2013.01); *H04L 1/20* (2013.01); *H04L 25/03235* (2013.01); *H04L 2025/03796* (2013.01)

(58) Field of Classification Search
None
See application file for complete search history.

(56) References Cited

U.S. PATENT DOCUMENTS

| | | | |
|---|---|---|---|
| 8,917,786 B1* | 12/2014 | von der Embse | .... H04L 1/0047 375/260 |
| 2001/0035997 A1 | 11/2001 | Agazzi | |
| 2002/0023246 A1 | 2/2002 | Jin | |
| 2002/0141507 A1 | 10/2002 | Morgan et al. | |

(Continued)

FOREIGN PATENT DOCUMENTS

| | | |
|---|---|---|
| CN | 1338839 A | 3/2002 |
| CN | 1369980 A | 9/2002 |

(Continued)

OTHER PUBLICATIONS

Kim, et al., "An Architecture for Faster than Nyquist Turbo Broadcasting," Department of Electrical and Computer Engineering, McGill University, 2012 7th International Symposium on Turbo Codes and Iterative Information Processing (ISTC), Aug. 27-31, 2012, pp. 170-174.

(Continued)

*Primary Examiner* — Phirin Sam
(74) *Attorney, Agent, or Firm* — Slater Matsil, LLP

(57) ABSTRACT

A method for operating a receiving device includes determining reliability ratings for undecoded data streams in a received transmission, selecting an undecoded data stream in the received transmission in accordance with the determined reliability ratings, thereby producing a selected data stream, and decoding the selected data stream with a decoding trellis, thereby producing a data symbol. The method also includes updating the decoding trellis in accordance with the data symbol, and repeating the selecting, the decoding, and the updating for remaining undecoded data streams in the received transmission.

28 Claims, 18 Drawing Sheets

(56) References Cited

U.S. PATENT DOCUMENTS

| | | |
|---|---|---|
| 2003/0058140 A1* | 3/2003 | Fimoff et al. .................... 341/50 |
| 2003/0191610 A1* | 10/2003 | Chen et al. ................... 702/191 |
| 2006/0164970 A1 | 7/2006 | Lee et al. |
| 2007/0092018 A1* | 4/2007 | Fonseka et al. ............. 375/265 |
| 2007/0201544 A1* | 8/2007 | Zhu et al. ..................... 375/229 |
| 2008/0049824 A1* | 2/2008 | Yang ................. H04L 25/03057 375/232 |
| 2008/0104486 A1* | 5/2008 | Kanaoka ....................... 714/780 |
| 2008/0181160 A1* | 7/2008 | Dillon ........................... 370/312 |
| 2009/0100319 A1* | 4/2009 | Potkonjak et al. ........... 714/792 |
| 2010/0080137 A1* | 4/2010 | Vedantham ........... H04L 5/0037 370/252 |
| 2010/0174954 A1* | 7/2010 | Karabed et al. .............. 714/704 |
| 2011/0188550 A1* | 8/2011 | Wajcer ................. H04L 25/068 375/214 |
| 2012/0147759 A1* | 6/2012 | Ratnakar et al. ............. 370/252 |
| 2012/0210197 A1* | 8/2012 | Jang et al. .................... 714/799 |
| 2013/0101015 A1* | 4/2013 | He ................... H04N 21/23432 375/240.02 |
| 2013/0121260 A1* | 5/2013 | Mukherjee ........ H04W 72/0466 370/329 |
| 2015/0098521 A1* | 4/2015 | Beidas ............... H04B 7/18517 375/296 |
| 2016/0191218 A1* | 6/2016 | Bala ...................... H04L 5/0007 370/203 |

FOREIGN PATENT DOCUMENTS

| | | |
|---|---|---|
| CN | 1812311 A | 8/2006 |
| CN | 102165705 A | 8/2011 |

OTHER PUBLICATIONS

Kim, et al., "Faster Than Nyquist Broadcast Signaling," Department of Electrical and Computer Engineering, McGill University, IEEE, 2012 26th Biennial Symposium on Communications, Kingston, Ontario, Canada, May 28-29, 2012, pp. 186-189.

International Search Report and Written Opinion of Patent Cooperation Treaty (PCT), Application No. PCT/CN2015/073719, date of mailing Jun. 12, 2015, 11 pages.

\* cited by examiner

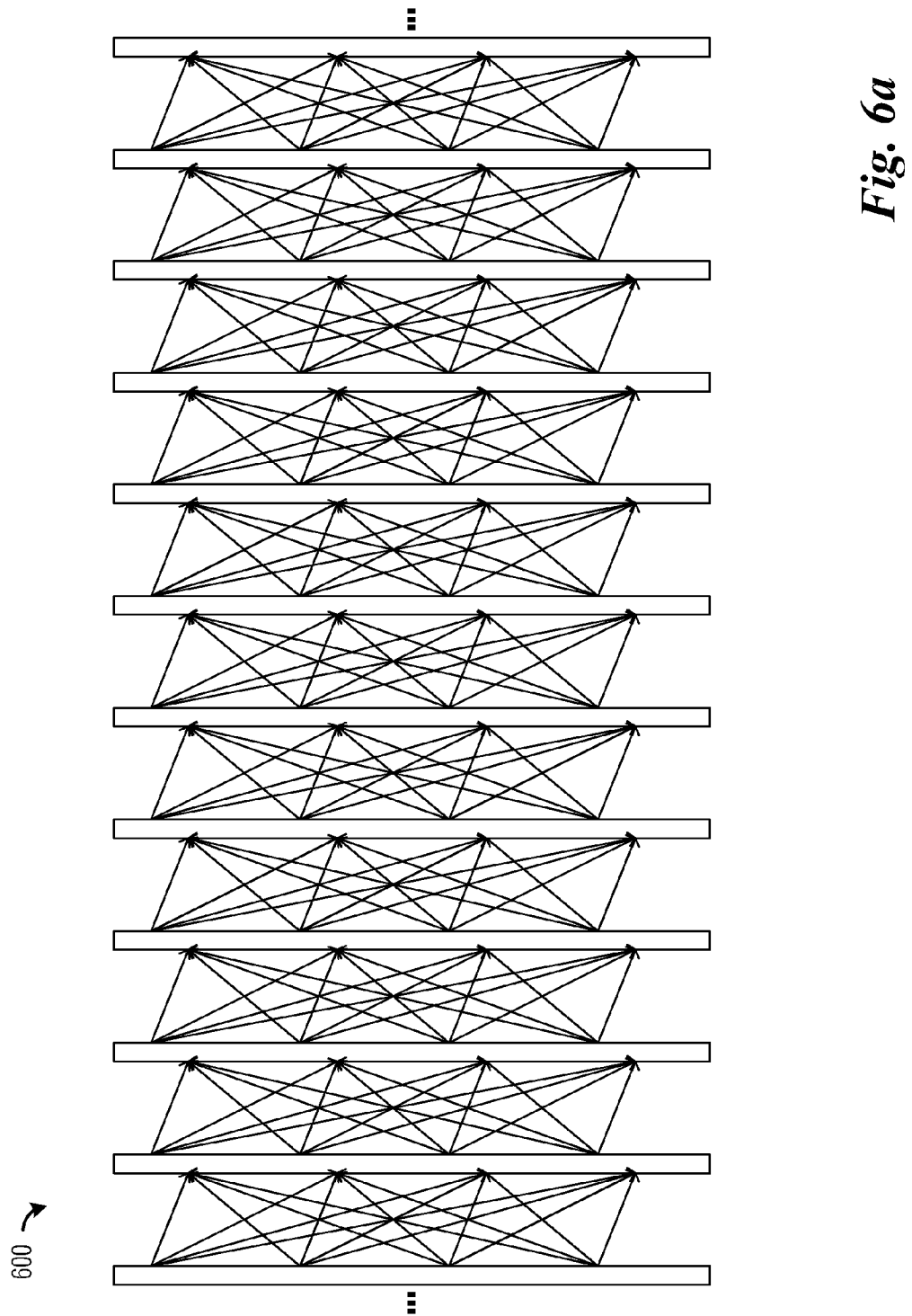

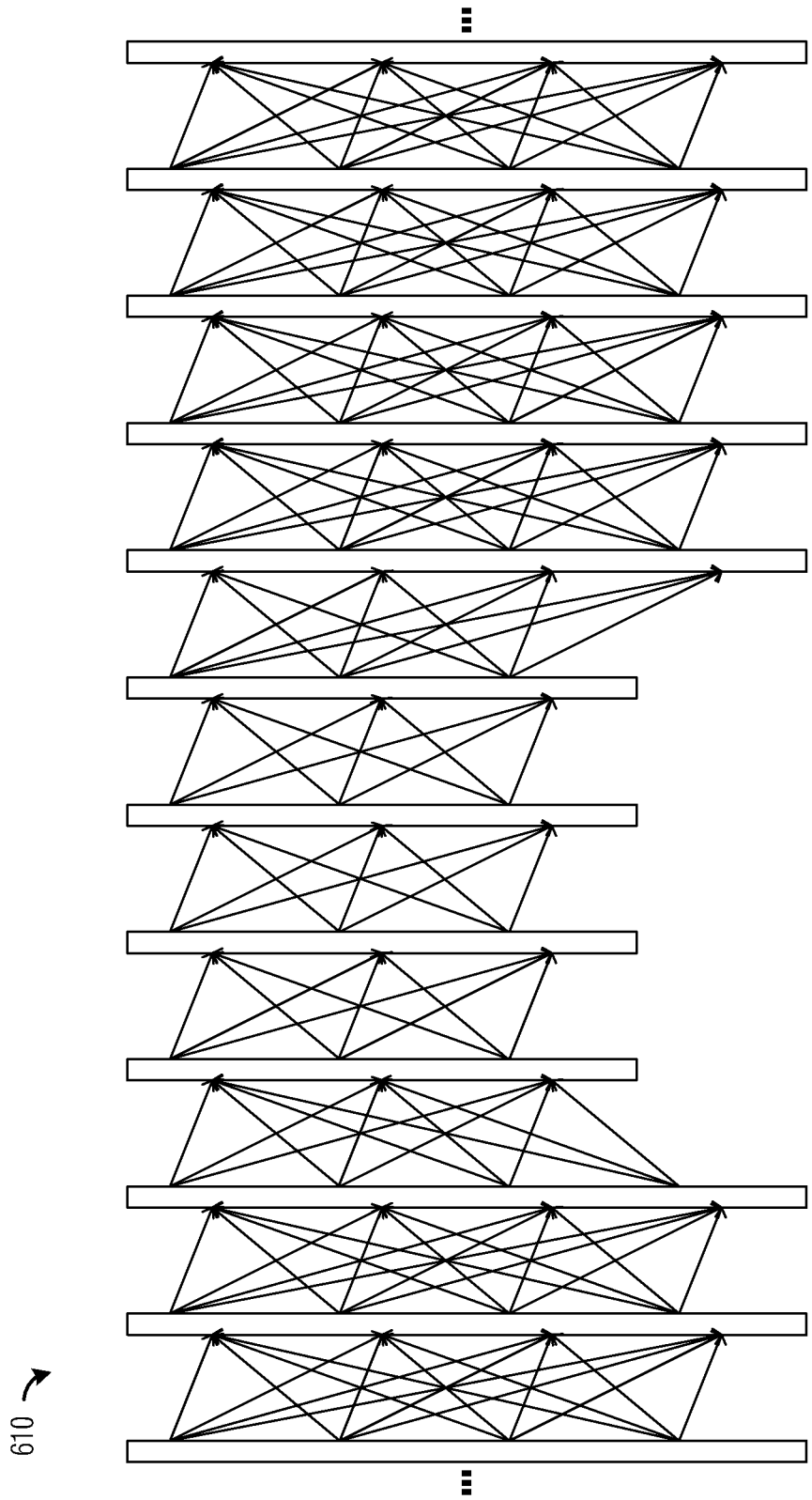

SYSTEM AND METHOD FOR FASTER THAN NYQUIST TRANSMISSION

TECHNICAL FIELD

The present disclosure relates generally to digital communications, and more particularly to a system and method for faster than Nyquist transmission.

BACKGROUND

Wireless interconnectivity has freed users from being tied down to fixed locations and wired connections. Through wireless interconnection networks, users are free to work and/or play wherever there is service. The use of wireless connections continues to grow dramatically year after year. Therefore, the need for systems and methods for providing greater and greater bandwidth also continues to grow.

SUMMARY OF THE DISCLOSURE

Example embodiments of the present disclosure which provide a system and method for faster than Nyquist transmission.

In accordance with an example embodiment of the present disclosure, a method for operating a receiving device is provided. The method includes determining, by the receiving device, reliability ratings for undecoded data streams in a received transmission, selecting, by the receiving device, an undecoded data stream in the received transmission in accordance with the determined reliability ratings, thereby producing a selected data stream, and decoding, by the receiving device, the selected data stream with a decoding trellis, thereby producing a data symbol. The method also includes updating, by the receiving device, the decoding trellis in accordance with the data symbol, and repeating, by the receiving device, the selecting, the decoding, and the updating for remaining undecoded data streams in the received transmission.

In accordance with another example embodiment of the present disclosure, a method for operating a transmitting device is provided. The method includes receiving, by the transmitting device, a first data stream and a second data stream, and independently encoding, by the transmitting device, each data stream. The method also includes interleaving, by the transmitting device, the encoded data streams producing interleaved data streams, and transmitting, by the transmitting device, the interleaved data streams.

In accordance with another example embodiment of the present disclosure, a receiving device is provided. The receiving device includes a receiver, and a processor operatively coupled to the receiver. The receiver receives a transmission. The processor determines reliability ratings for undecoded data streams in the transmission, selects an undecoded data stream in the transmission in accordance with the determined reliability ratings, thereby producing a selected data stream, decodes the selected data stream with a decoding trellis, thereby producing a data symbol, updates the decoding trellis in accordance with the data symbol, and repeats the selecting, the decoding, and the updating for remaining undecoded data streams in the transmission.

One advantage of an embodiment is that trellis state pruning using successfully decoded and periodic reliable symbols helps to increase decoding accuracy by eliminating uncertainty due to the smaller number of trellis states in the pruned trellis.

A further advantage of an embodiment is that faster than Nyquist transmission enables the transmission of more data, thereby increasing data rates.

BRIEF DESCRIPTION OF THE DRAWINGS

For a more complete understanding of the present disclosure, and the advantages thereof, reference is now made to the following descriptions taken in conjunction with the accompanying drawing, in which:

FIGS. 6a through 6e illustrate example decoding trellises according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to faster than Nyquist transmission. For example, a receiving device determines reliability ratings for undecoded data streams in a received transmission, selects an undecoded data stream in the received transmission with a highest reliability rating, thereby producing a selected data stream, and decodes the selected data stream with a decoding trellis, thereby producing a data symbol. The receiving device also updates the decoding trellis in accordance with the data symbol, and repeats the selecting, the decoding, and the updating for remaining undecoded data streams in the received transmission.

The present disclosure will be described with respect to example embodiments in a specific context, namely communications systems that use faster than Nyquist transmission to increase data rates. The disclosure may be applied to standards compliant communications systems, such as those that are compliant with Third Generation Partnership Project (3GPP), IEEE 802.11, and the like, technical standards, and non-standards compliant communications systems, that use faster than Nyquist transmission to increase data rates.

The Nyquist inter-symbol interference (ISI) criterion specifies conditions, which when met, ensures that no ISI occurs. In general, the Nyquist ISI criterion states that when consecutive symbols are transmitted over a communications channel, the impulse response of the communications channel causes the transmitted symbols to spread in the time domain and causes ISI. The Nyquist ISI criterion further states that if the consecutive symbols are appropriately separated in time, there is no ISI. The appropriate separation for the consecutive symbols, also referred to the Nyquist interval $T_N$, is expressible as:

$$T_N = \sum_{k=-\infty}^{\infty} \left| H\left(f - \frac{k}{T_N}\right) \right|^2,$$

where f is the frequency, and $|H(f)|^2$ is the frequency response of an end-to-end pulse shape including a transmit pulse shape, a channel impulse response, and a receive matched filter. In other words, the summation of the frequency shifted versions of the symbols must sum to a constant value.

Figure 1:
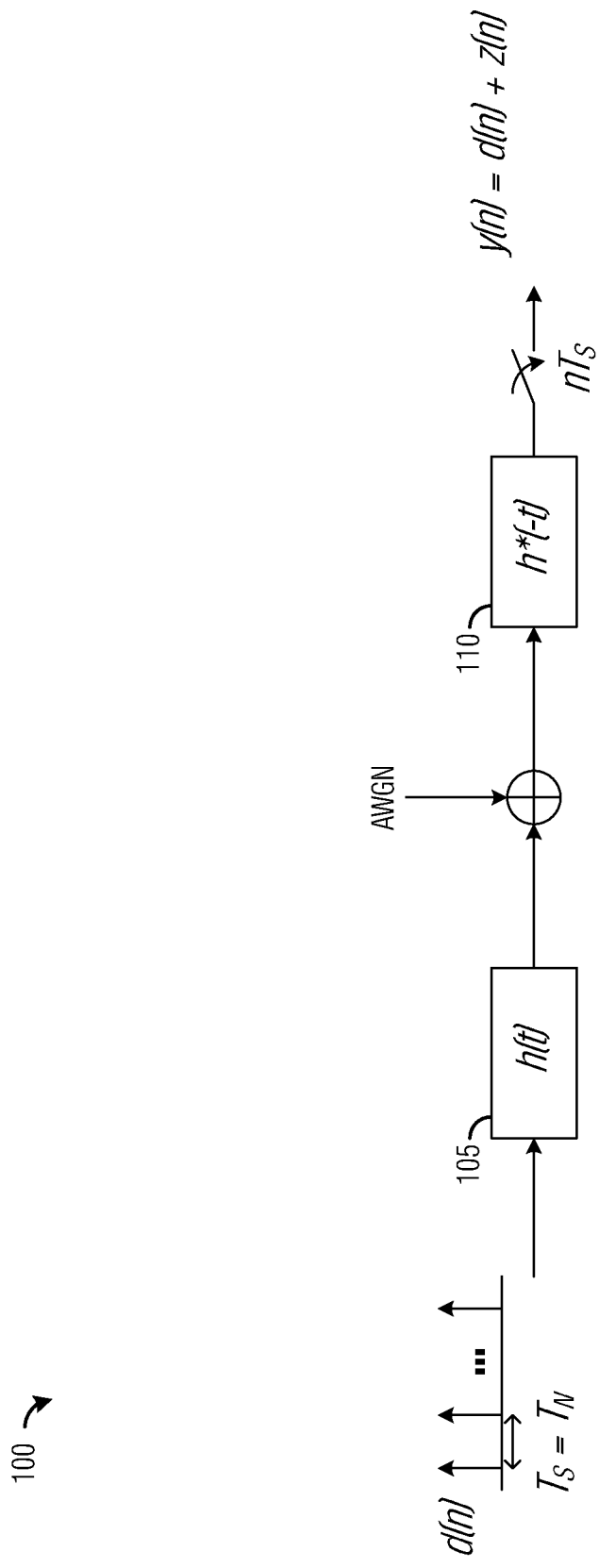
FIG. 1 illustrates an example model of a communications system highlighting the Nyquist ISI criterion according to example embodiments described herein.

FIG. 1 illustrates an example model 100 of a communications system highlighting the Nyquist ISI criterion. Model 100 includes an impulse response of a pulse shape 105 used by a transmitter, denoted h(t), and an impulse response of a matched filter 110 used by a receiver, denoted h*(−t). Also shown in model 100, consecutive symbols, denoted d(n), represent a sequence of symbols transmitted by the transmitter. Individual symbols in the consecutive symbols are separated in time by interval $T_S$. Model 100 also includes a model of noise occurring in the communications channel, shown as additive white Gaussian noise (AWGN). After application of impulse response 110, if a sampling interval ($T_S$) at the receiver is equal to the Nyquist interval, the received signal, denoted y(n), is expressible as $$y(n)=d(n)+z(n),$$

where d(n) is the transmitted signal, and z(n) is the noise due to the communications channel, but there is no ISI.

However, if the symbols in the transmitted signal are separated by less than the Nyquist interval, i.e., $T_S<T_N$, where ($T_S=\tau T_N$, $0<\tau<1$), there is ISI present in the received signal. $\tau$ may be referred to as the faster than Nyquist (FTN) factor, as $\tau$ approaches 0, ISI increases. A similar way to characterize the transmission is by the FTN rate, which is expressible as $$\frac{1}{T_S} = \frac{1}{\tau T_N}.$$

If $\tau$ is equal to 1, the transmitted signal is at the Nyquist rate and ISI is not present at the received signal. The received signal may be expressed as:

$$y(n)=\Sigma_m d(m)g(n-m)+z(n),$$

where the ISI, g(n−m), is expressible as $$g(n-m)=\int_{-\infty}^{\infty} h(t-m\tau T_N)h^*(t-n\tau T_N)dt.$$

According to an example embodiment, since it is noted that the ISI is a result of the convolution of the received signal, or symbols therein, with a known pulse shape, i.e., symbols of the received signal, the ISI may be modeled using a trellis diagram. Furthermore, a maximum likelihood (ML) receiver can be implemented using a Viterbi algorithm.

Figure 2:
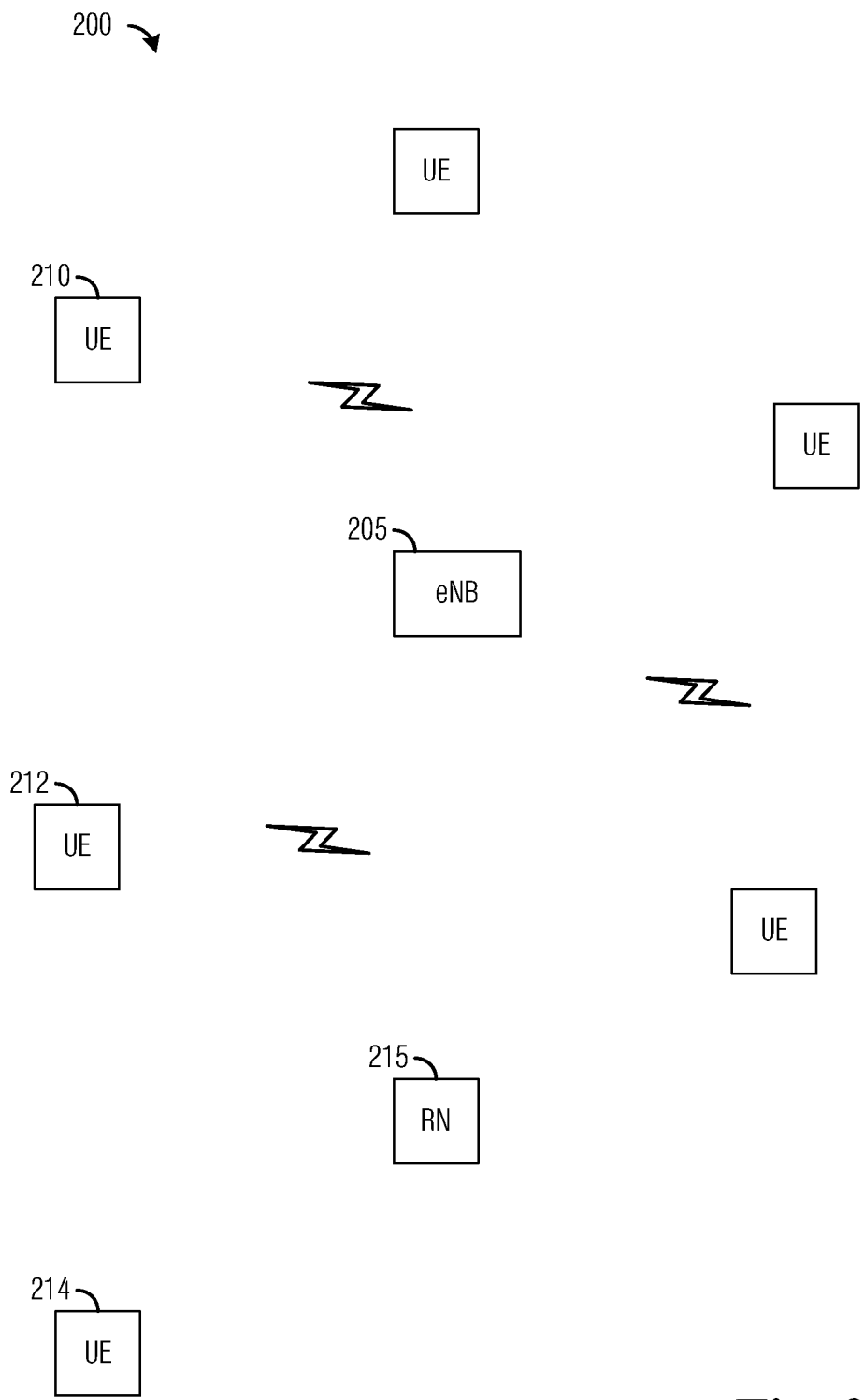
FIG. 2 illustrates an example communications system according to example embodiments described herein.

FIG. 2 illustrates an example communications system 200. Communications system 200 may include an evolved NodeB (eNB) 205 operating as a communications controller. Communications system 200 may also include User Equipment (UE), such as UE 210, 212, and 214. In general, an eNB may also be referred to as a communications controller, a NodeB, a base station, a controller, and the like. Similarly, a UE may also be referred to as a mobile station, a mobile, a terminal, a user, a subscriber, and the like. Communications system 100 may also include a relay node (RN) 118 that is capable of utilizing a portion of resources of eNB 105 to help improve coverage and/or overall performance of communications system 100.

While it is understood that communications systems may employ multiple eNBs capable of communicating with a number of devices, only one eNB, one RN, and a number of UEs are illustrated for simplicity.

According to an example embodiment, it is possible to exploit the fact that ISI arises from the convolution of the received signal (or the symbols in the received signal) with known pulse shapes (e.g., symbols of the received signal already decoded). In other words, it is possible to use already decoded symbols of the received signal to help in the decoding of the undecoded portions of the received signal.

Figure 3A:
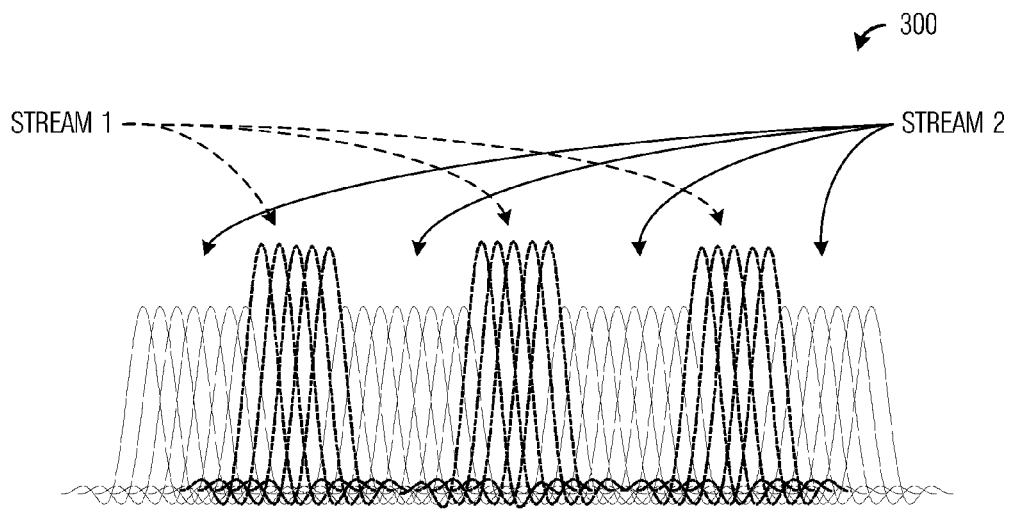
FIGS. 3a through 3c illustrate example time domain pulses highlighting conditions having impact on reliability factor according to example embodiments described herein.

Generally, the ability of a receiver to decode a received signal may be related to the signal's reliability factor. A received signal with a high reliability factor will typically be successfully decoded with higher probability than a received signal with a low reliability factor. The reliability factor of a received signal may be dependent on a number of conditions. FIG. 3a illustrates a diagram of time domain pulses 300 highlighting a first condition having an impact on the reliability factor of a received signal. The first condition is the signal to noise ratio (SNR) of the received signal, with a received signal with a high SNR will usually being easier to decode than a received signal with a low SNR. In other words, a signal with a larger difference between signal to noise will typically be easier to decode than a signal with a smaller difference between signal to noise. A similar condition may be the received signal's signal plus interference to noise ratio (SINR).

Figure 3B:
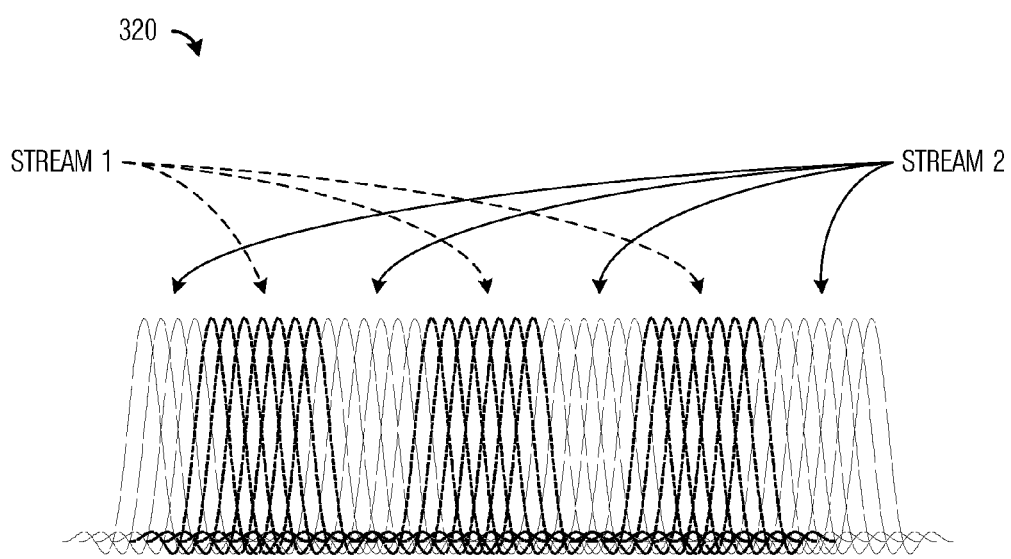

FIG. 3b illustrates a diagram of time domain pulses 320 highlighting a second condition having an impact on the reliability factor of a received signal. The second condition is the coding rate, such as forward error correcting (FEC) rate, of the received signal, with a received signal with a low coding rate usually being easier to decode than a received signal with a high coding rate.

Figure 3C:
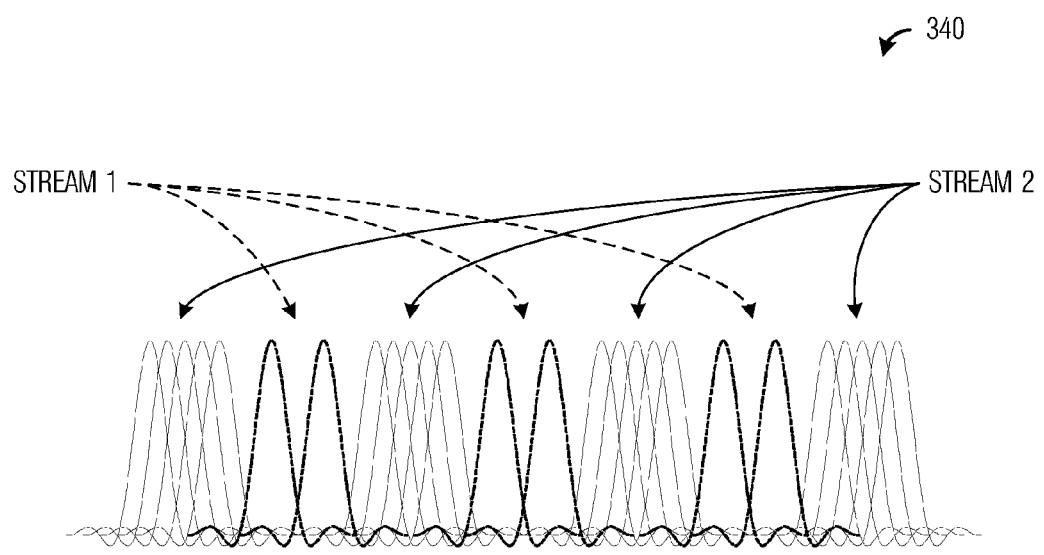

FIG. 3c illustrates a diagram of time domain pulses 340 highlighting a third condition having an impact on the reliability factor of a received signal. The third condition is the FTN factor τ. A received signal with a high FTN factor (i.e., closer to 1 and the Nyquist rate) will usually be easier to decode than a received signal with a low FTN factor (i.e., closer to 0) since the received signal with the high FTN factor will typically have lower ISI.

In general, there may be a variety of situations where a single receiving device receives multiple received signals from one or more transmitting devices. In a first situation, a single receiving device receives multiple received signals from a single transmitting device. As an illustrative example, in a downlink, the receiving device may be a UE that has several simultaneous connections with an eNB, and each simultaneous connection may result in the eNB transmitting to the UE. As another illustrative example, in a downlink, UEs may be scheduled periodically for short durations. Each stream may be intended for decoding by corresponding UE, however, the received signal at each UE also contains the streams intended for the other UEs. In a second situation, a single receiving device receives multiple received signals from multiple transmitting devices. As an illustrative example, in a downlink, the receiving device may be a UE that is part of a coordinated multiple point (CoMP) operating set with a plurality of transmission points, and each transmission point may transmit to the UE. As another illustrative example, in an uplink, the receiving device may be an eNB receiving transmissions from a plurality of UE. It is noted that in any of these situations, one or more of the received signals may contain reference signals or pilots instead of actual data and may be used to help improve decoding performance.

According to an example embodiment, the ISI present in received signals transmitted at FTN rates may be modeled with a trellis, and received signals (hereinafter referred to as streams) may be transmitted with different reliability factors to enable the use of decoded symbols to assist in the decoding of undecoded symbols. As an illustrative example, a first stream may be transmitted with a high reliability factor and a second stream may be transmitted at a low reliability factor. The first stream may be decoded using the trellis prior to decoding the second stream and symbols from the first stream may be used to help decode the second stream by pruning the trellis to improve the decoding performance of the second stream.

According to an example embodiment, the streams may be interleaved to help improve decoding performance. In other words, the streams may be partitioned into portions and the portions may be interleaved with each other to help improve decoding performance.

Figure 4A:
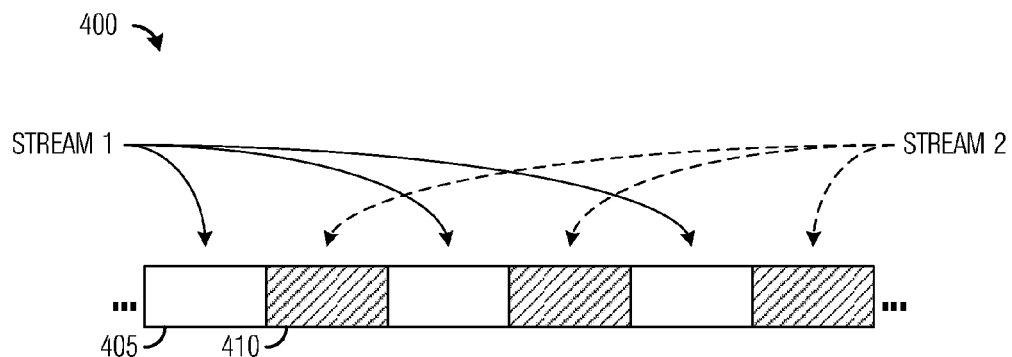
FIGS. 4a through 4c illustrate portions of example transmission blocks according to example embodiments described herein.

FIG. 4a illustrates a portion of a first example transmission block 400. Transmission block 400 includes signals from two streams: stream 1 and stream 2. Portions of stream 1 and stream 2 are interleaved. As an illustrative example, portions of stream 1 occupy odd numbered subblocks of transmission block 400 (such as subblock 405) and portions of stream 2 occupy even numbered subblocks of transmission block 400 (such as subblock 410).

Figure 4B:
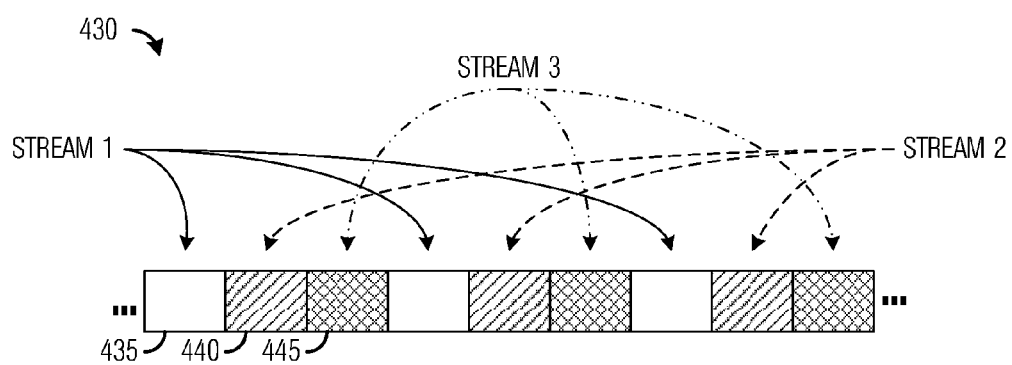

FIG. 4b illustrates a portion of a second example transmission block 430. Transmission block 430 includes signals from three streams: stream 1, stream 2, and stream 3. Portions of stream 1, stream 2, and stream 3 are interleaved. As an illustrative example, portions of stream 1 occupy the first of every third subblock of transmission block 430 (such as subblock 435), portions of stream 2 occupy the second of every third subblock of transmission block 430 (such as subblock 440), and portions of stream 3 occupy the third of every third subblock of transmission block 430 (such as subblock 445).

Figure 4C:
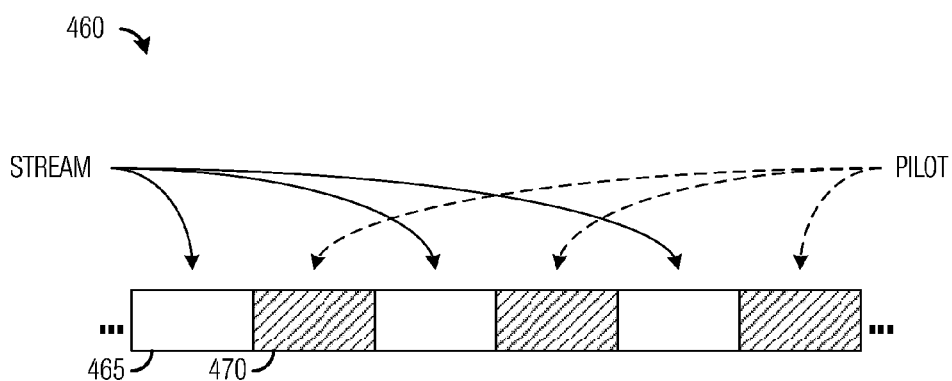

FIG. 4c illustrates a portion of a third example transmission block 460. Transmission block 460 includes signals from a single stream and a pilot signal. Portions of the stream and the pilot signal are interleaved. As an illustrative example, portions of the stream occupy odd numbered subblocks of transmission block 460 (such as subblock 465) and portions of the pilot signal occupy even numbered subblocks of transmission block 460 (such as subblock 470). Although pilot signals are discussed in FIG. 4c, other signals, such as reference signals, or known signals, may be used in place of pilot signals.

FIGS. 4a through 4c present illustrative examples for interleaving multiple streams and/or pilots. Other interleaving arrangements are possible and the examples shown in FIGS. 4a through 4c should not be construed as being limiting to either the scope or the spirit of the example embodiments.

Figure 5:
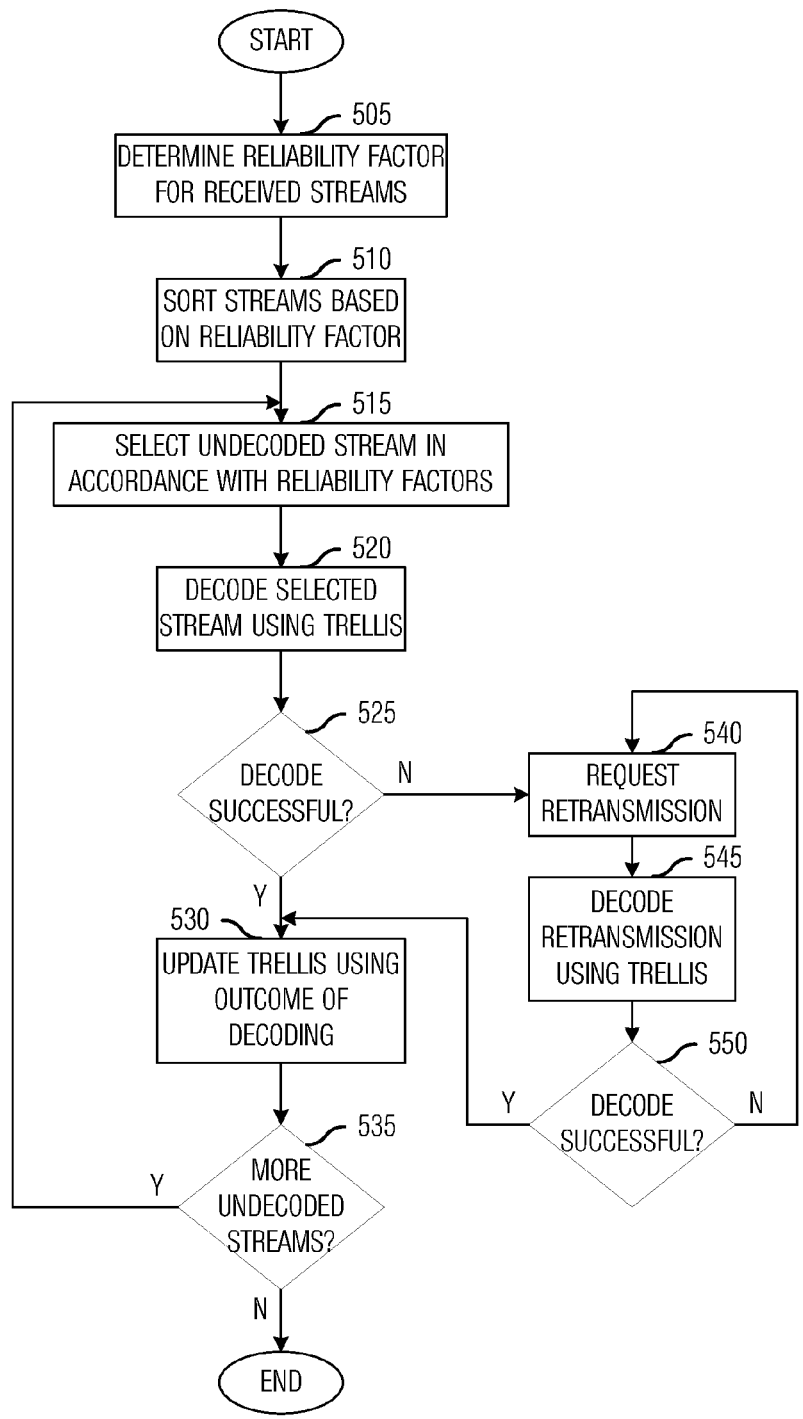
FIG. 5 illustrates a flow diagram of example operations occurring at a receiving device, as the receiving device decodes multiple streams transmitted at a FTN rate(s) according to example embodiments described herein.

FIG. 5 illustrates a flow diagram of example operations 500 occurring at a receiving device, as the receiving device decodes multiple streams transmitted at a FTN rate(s). Operations 500 may be indicative of operations occurring at a receiving device, such as a UE or an eNB, as the receiving device decodes multiple streams of a received signal transmitted at a FTN rate(s).

Operations 500 may begin with the receiving device determining reliability factors for each of the multiple streams (block 505). As discussed previously, the reliability factor for a stream may be based on a number of conditions, including one or more of SNR, SINR, coding rate (e.g., FEC), and FTN factor. As an illustrative example, a stream's reliability factor may be a numerical value assigned to the stream based on the condition(s) associated with the stream. As an example, if the stream has a high SNR, a low coding rate, or a high FTN factor, the stream's reliability factor may be high. Similarly, if the stream has a low SNR, high coding rate, or a low FTN factor, the stream's reliability factor may be low. The receiving device may sort the streams in the multiple streams in accordance with the respective reliability factors (block 510). As an illustrative example, the receiving device may sort the streams in descending order of reliability factor.

The receiving device may select an undecoded stream in accordance with the reliability factors (block 515). As an illustrative example, the receiving device may select an undecoded stream with the highest reliability factor. As another illustrative example, the receiving device may select an undecoded stream with a reliability factor exceeding a predetermined reliability threshold. If there are more than one undecoded streams with reliability factors exceeding the predetermined reliability threshold, the receiving device may select the highest or alternatively, select one at random, select one based on a criteria, such as stream priority, stream source priority, application priority, and the like. As an example, on a first pass, the receiving device may select an undecoded stream with the highest of all reliability factors since none of the streams have been decoded. On a second pass, the receiving device may select an undecoded stream with the second highest reliability factor. In general, on an N-th pass, the receiving device may select an undecoded stream with the N-th highest reliability factor.

The receiving device may decode the selected stream using a decoding trellis (block 520). FIG. 6a illustrates an example decoding trellis 600. In general, decoding the selected stream involves traversing the decoding trellis using the symbols of the selected stream to select an incoming path to a subsequent stage of the decoding trellis. As an example, at a particular stage of the decoding trellis, an incoming path may be selected based on a symbol of the selected stream. As the decoding trellis is traversed, decoded data corresponding to the selected stream is produced.

The receiving device may perform a check to determine if the selected stream was successfully decoded (block 525). As an example, the receiving device may utilize a cyclic redundancy check(s) (CRC) on the decoded data to determine if the selected stream was successfully decoded. If the CRC matches, the decoding may be deemed to be successful, while if the CRC does not match, the decoding may be deemed to be unsuccessful.

If the selected stream was successfully decoded, the receiving device may update the decoding trellis using the outcome of the decoding of the selected stream (block 530). In general, updating the decoding trellis with the outcome of the decoding of the selected stream involves the pruning of some of the trellis states of the decoding trellis. Specifically, some of the states of the stages of the decoding trellis involving the outcome of the decoding of the selected stream may be pruned. The pruning of the decoding trellis reduces the number of possible states in the stages and thereby reduces decoding uncertainty.

Figure 6C:
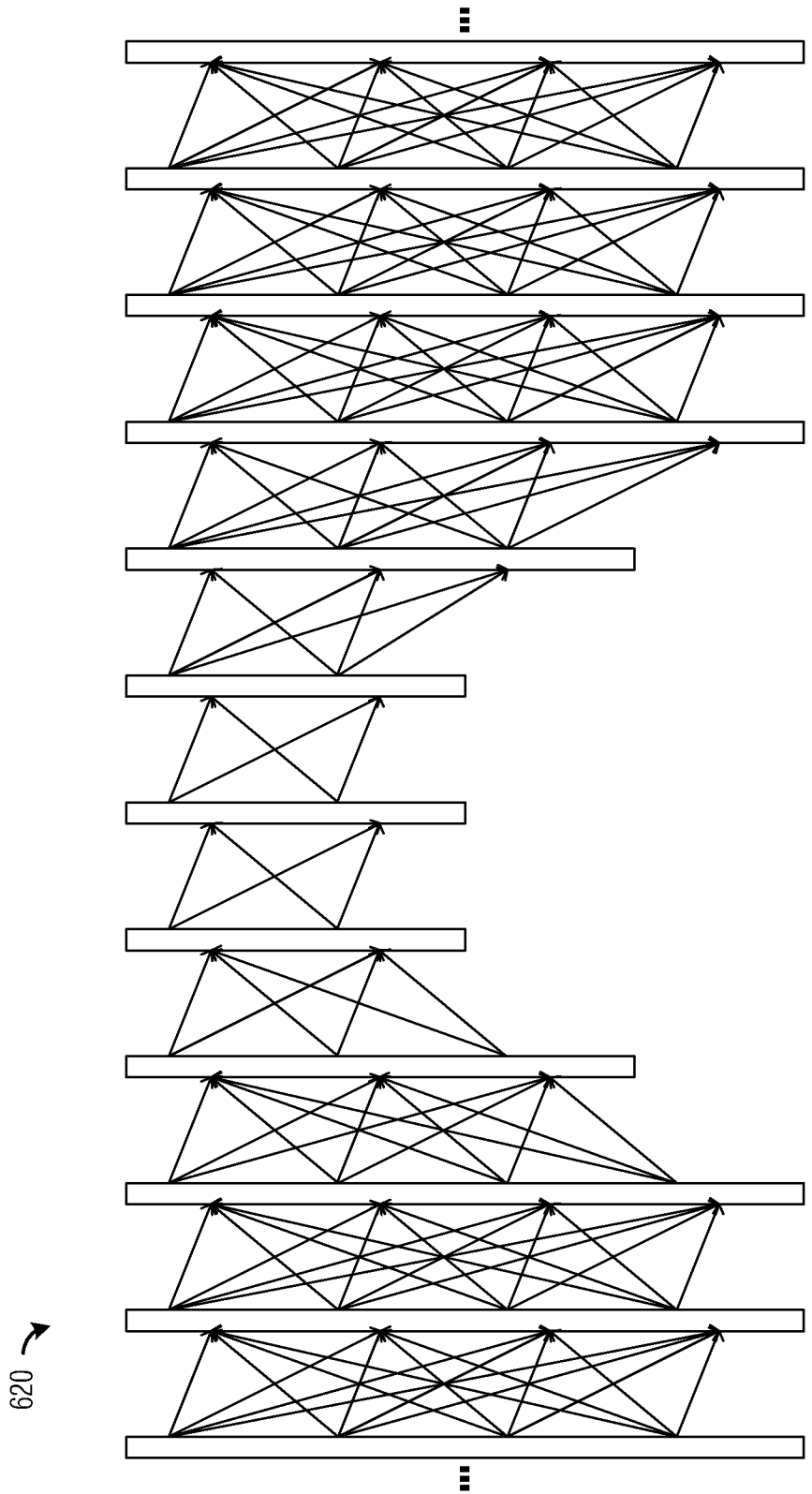
Figure 6D:
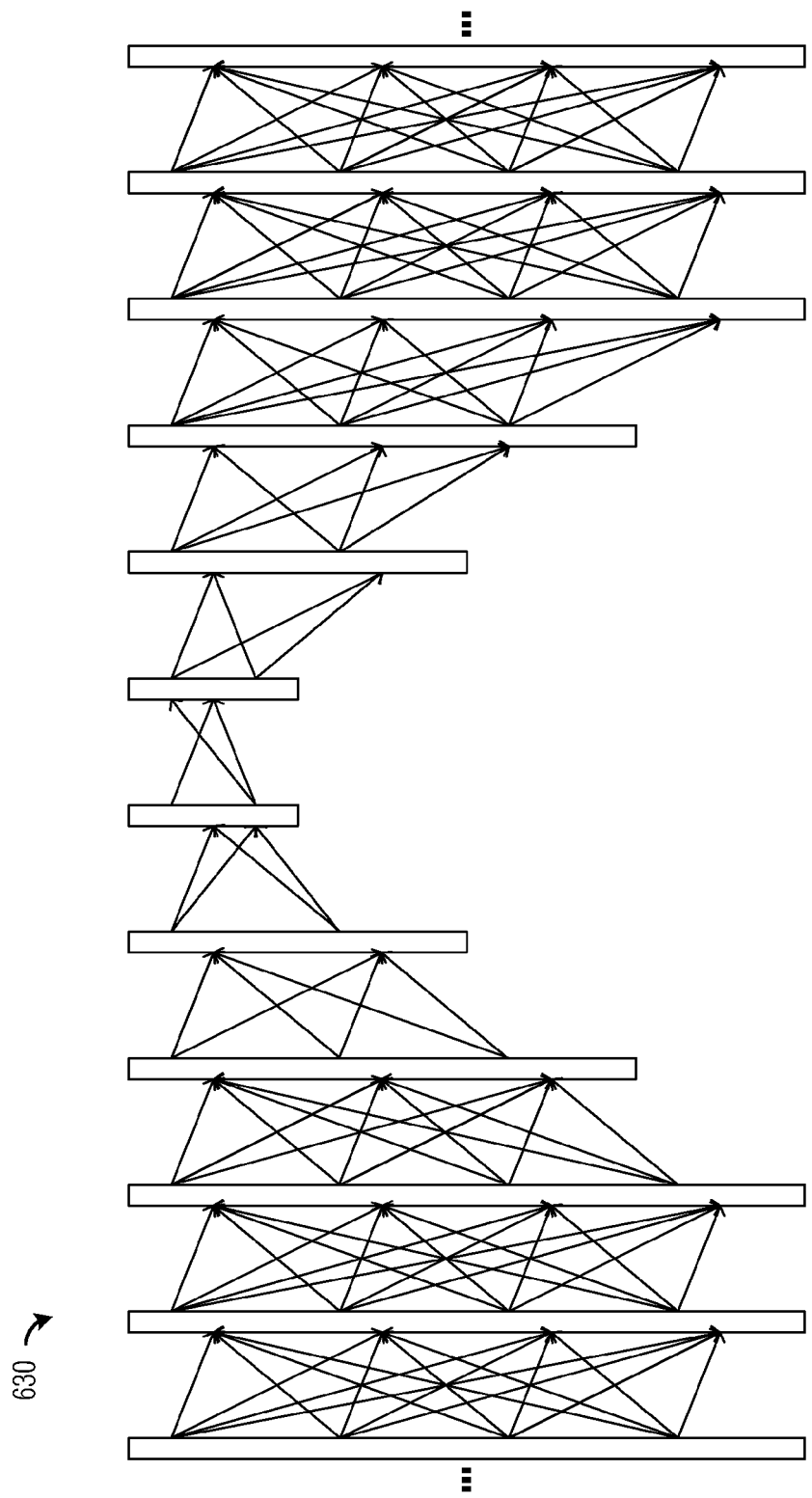
Figure 6E:
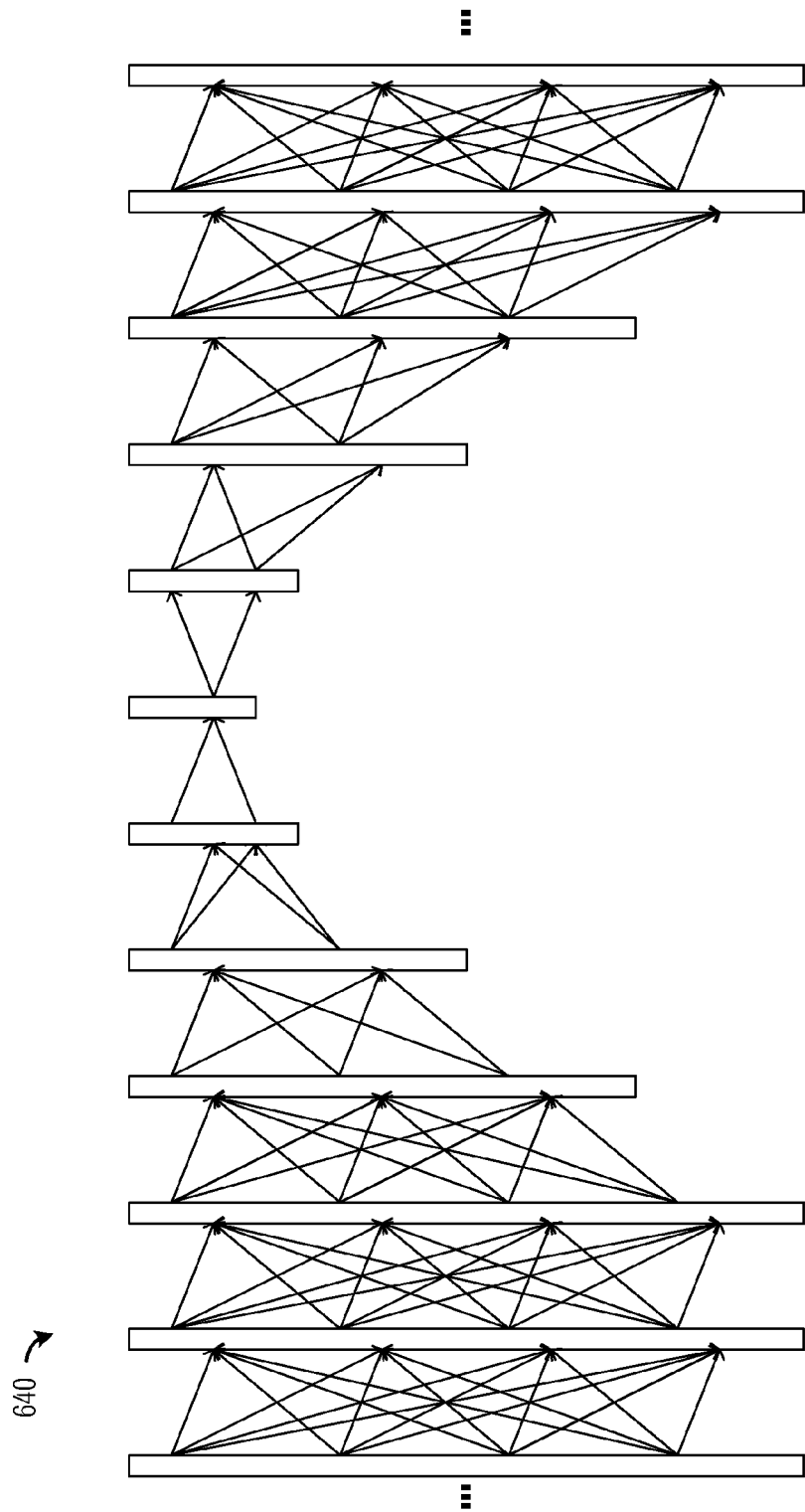

FIG. 6b illustrates an example decoding trellis 610 after pruning with a single reliable symbol. Decoding trellis 610 illustrates the elimination of some trellis states in some trellis stages when the trellis memory size is 4. FIGS. 6c through 6e illustrate example decoding trellises after pruning with two, three, and four reliable symbols. Decoding trellis 620 of FIG. 6c illustrates the elimination of some trellis states in some trellis stages when the trellis memory size is 4. It is noted that with two reliable symbols, states in 5 trellis stages may be pruned. Decoding trellis 630 of FIG. 6d illustrates the elimination of some trellis states in some trellis stages when the trellis memory size is 4. It is noted that with three reliable symbols, states in 6 trellis stages may be pruned. Decoding trellis 640 of FIG. 6e illustrates the elimination of some trellis states in some trellis stages when the trellis memory size is 4. It is noted that with four reliable symbols, states in 7 trellis stages may be pruned. In general, when trellis memory size is M, with N reliable symbols decoded, states in N+M−1 trellis stages may be pruned.

Figure 7A:
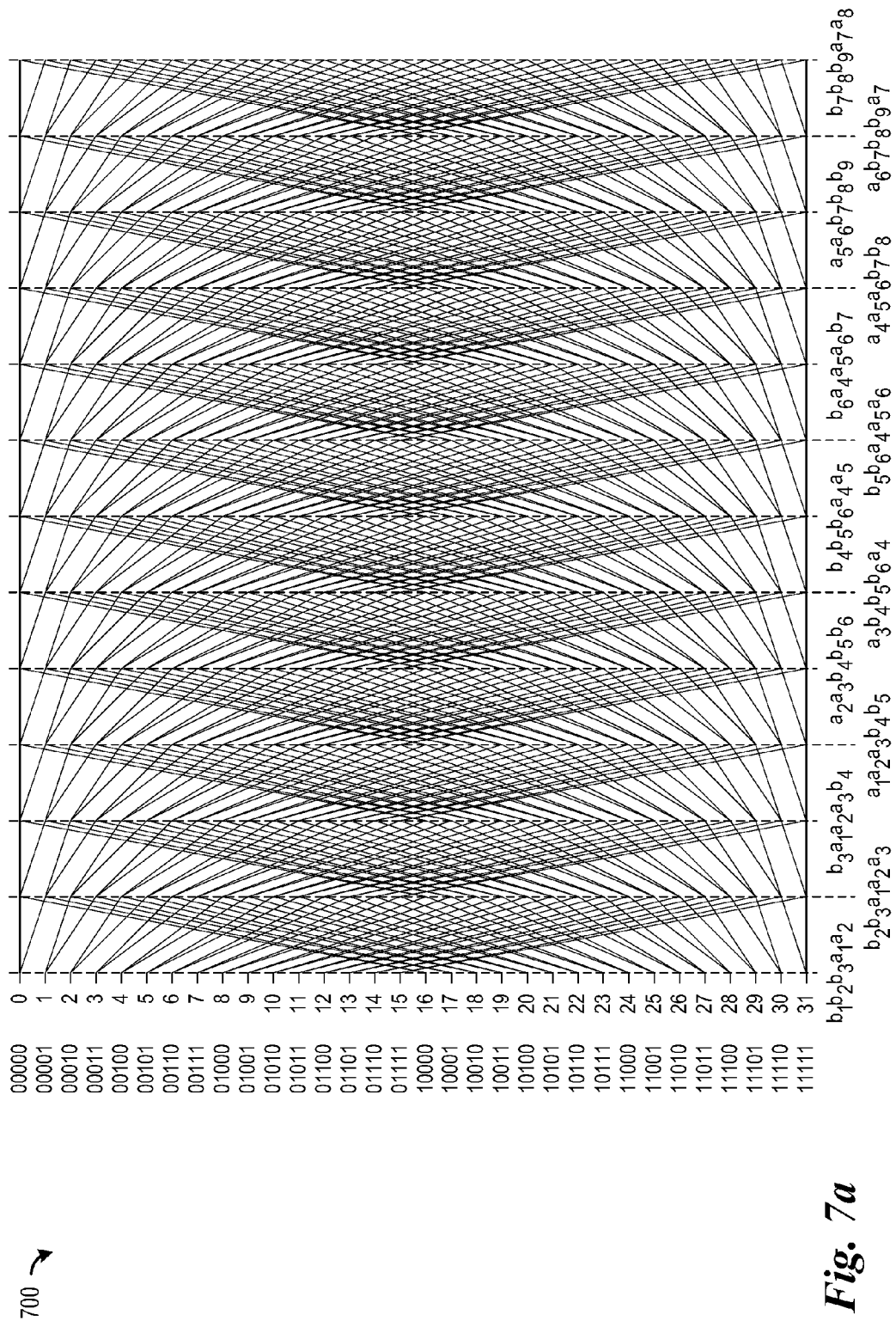
FIG. 7a illustrates an example decoding trellis prior to pruning according to example embodiments described herein.

FIG. 7a illustrates an example decoding trellis 700 prior to pruning. Decoding trellis 700 may have a memory size of 5. For discussion purposes, consider a situation where there are two streams, both using binary phase shift keying (BPSK). Therefore, decoding trellis 700 has $2^5=32$ states per stage. The data sequences of the two streams may be interleaved in portions of size 3 each. In other words, a received signal expressible as

[b1 b2 b3][a1 a2 a3][b4 b5 b6][a4 a5 a6][b7 b8 b9][a7 a8 a9] . . .

is received at a receiving device, where $b_i$'s and $a_i$'s are the BPSK symbol sequences of the two streams.

Figure 7B:
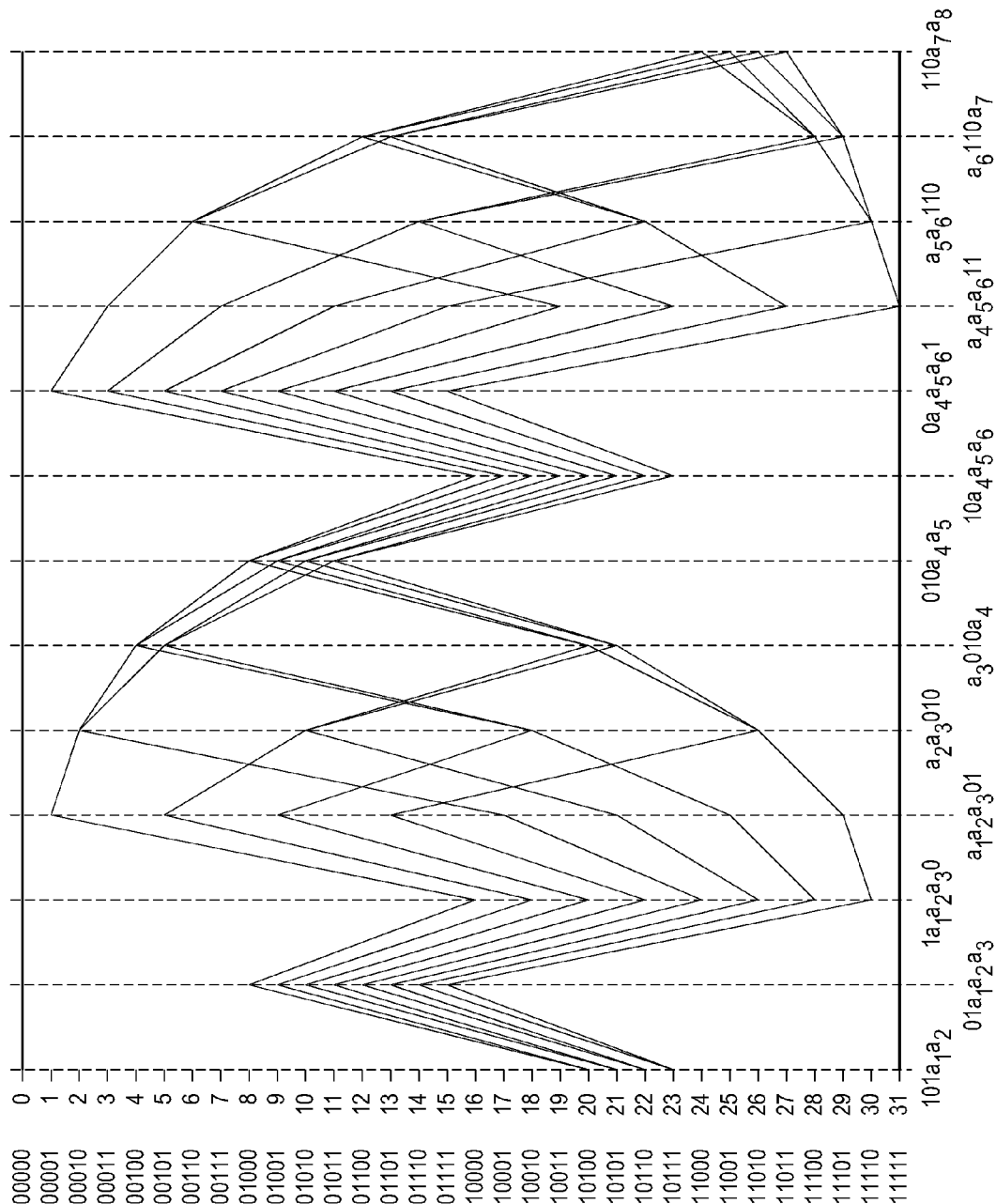
FIG. 7b illustrates an example decoding trellis that has been pruned according to example embodiments described herein.

FIG. 7b illustrates an example decoding trellis 750 that has been pruned. For discussion purposes, consider the situation that the $b_i$ sequence has a higher reliability factor and is successfully decoded as 10101110. A first stage shows the trellis stage for received sequence [1 0 1 a1 a2], which corresponds to [b1 b2 b3 a1 a2] with the $b_i$ sequence decoded, a second stage shows the trellis stage for received sequence [0 1 a1 a2 a3], which corresponds to [b2 b3 a1 a2 a3], and so on. Clearly, decoding trellis 750 for the $a_i$ sequence has a better performance than decoding trellis 700 for the $a_i$ sequence.

Referring back now to FIG. 5, the receiving device may perform a check to determine if there are any more undecoded streams (block 535). If there are no more undecoded streams, operations 500 may terminate. If there are more undecoded streams, the receiving device may return to block 515 to select an undecoded stream in accordance with the reliability factor and repeat the decoding and updating process. If the decoding of the selected stream was unsuccessful (block 525), the receiving device may request retransmission, for example, of the selected stream that was unsuccessfully decoded (block 540). The retransmission may be requested through a technique such as hybrid automatic repeat requested (HARQ), and the like. The receiving device may decode the retransmission (block 545). As an illustrative example, the receiving device may independently decode the retransmission using a separate decoding trellis. As another illustrative example, the receiving device may decode the retransmission using the same decoding trellis it used in the earlier decoding attempt, e.g., block 520.

The receiving device may perform a check to determine if the decoding of the retransmission was successful (block 550). If the decoding of the retransmission was successful, the receiving device may update the decoding trellis using the outcome of the decoding of the selected stream (block 530). If the decoding of the retransmission was not successful, the receiving device may request retransmission (block 540). It is noted that a recovery mechanism that limits the number of retransmissions may be implemented to prevent the receiving device from continually requesting retransmissions. As an illustrative example, the recovery mechanism may set a maximum number of retransmissions and the receiving device may request retransmissions until it has reached the maximum number of retransmissions, at which point, the receiving device may stop requesting retransmissions. The receiving device may stop the decoding process, and operations 500 may terminate.

Figure 8:
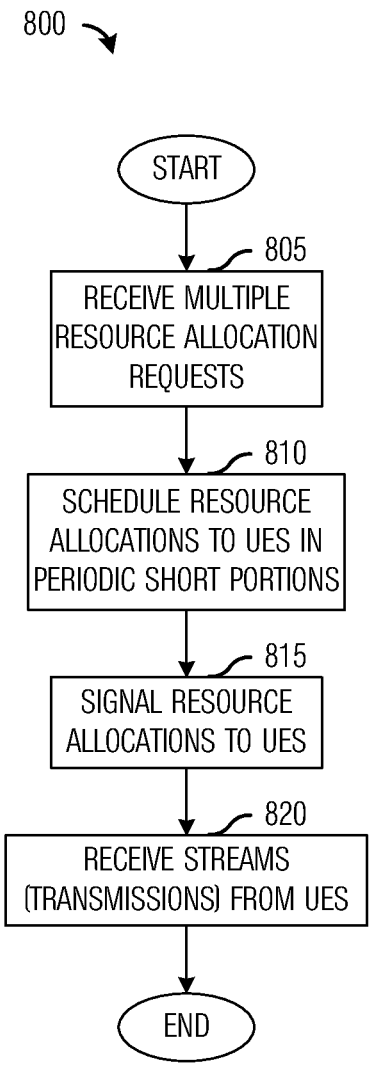
FIG. 8 illustrates a flow diagram of example operations occurring in a receiving device as the receiving device decodes multiple streams transmitted at a FTN rate(s) from multiple transmitting devices according to example embodiments described herein.

FIG. 8 illustrates a flow diagram of example operations 800 occurring in a receiving device as the receiving device decodes multiple streams transmitted at a FTN rate(s) from multiple transmitting devices. Operations 800 may be indicative of operations occurring at a receiving device, such as an eNB, as the receiving device decodes multiple streams of a received signal transmitted at a FTN rate(s) from multiple transmitting devices. In this situation, the receiving device is operating as a communications controller and allocating resources for the multiple streams of the received signal.

Operations 800 may begin with the receiving device receiving multiple resource allocation requests from UEs (block 805). The resource allocation requests may specify the communications requirements of the individual transmitting devices, such as data bandwidth, frequency of transmission, transmission type and/or priority, and the like. The receiving device may schedule resource allocations for a subset of the UEs (block 810). According to an example embodiment, the receiving device may schedule resource allocations for the subset in such a way that the streams (transmissions) from the subset are partitioned into portions and the portions of a stream from a single UE are interleaved with portions of streams from other UEs in the subset. In other words, the streams are scheduled to resources in a periodic manner. The receiving device may signal information about the resource allocations to the subset of the UEs (block 815).

The receiving device may receive the streams from the subset of the UEs (block 820). Since the streams from the UEs were scheduled in a periodic manner, the receiving device may receive a signal having the appearance similar to that shown in FIGS. 4a through 4c. The receiving device may decode the multiple streams using a technique wherein the streams are decoded in accordance with their reliability factor and the decoded symbols are used to prune a decoding trellis, such as a technique described in FIG. 5.

Figure 9:
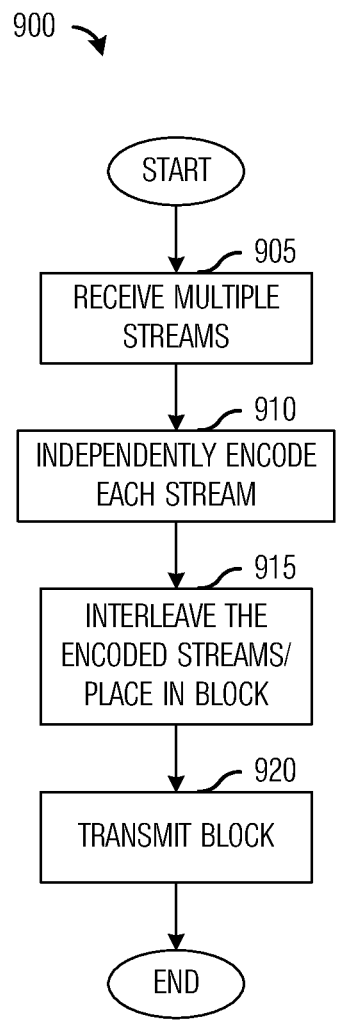
FIG. 9 illustrates a flow diagram of example operations occurring in a transmitting device as the transmitting device transmits multiple streams at a FTN rate(s) according to example embodiments described herein.

FIG. 9 illustrates a flow diagram of example operations 900 occurring in a transmitting device as the transmitting device transmits multiple streams at a FTN rate(s). Operations 900 may be indicative of operations occurring in a transmitting device, such as an eNB or a UE, as the transmitting device transmits multiple streams at a FTN rate(s).

Operations 900 may begin with the transmitting device receiving multiple streams to be transmitted (block 905). As an illustrative example, the transmitting device may be the eNB that receives data from one or more sources with connections to a receiving device or multiple receiving devices, the transmitting device may be a UE with connections to a plurality of services by way of the receiving device (e.g., an eNB) and the UE has data to transmit to the services, and the like. The transmitting device may independently encode the streams (block 910). The transmitting device may interleave portions of the encoded streams and placed the interleaved portions into a transmission block (block 915). The transmitting device may transmit the transmission block to the receiving device (block 920).

Figure 10:
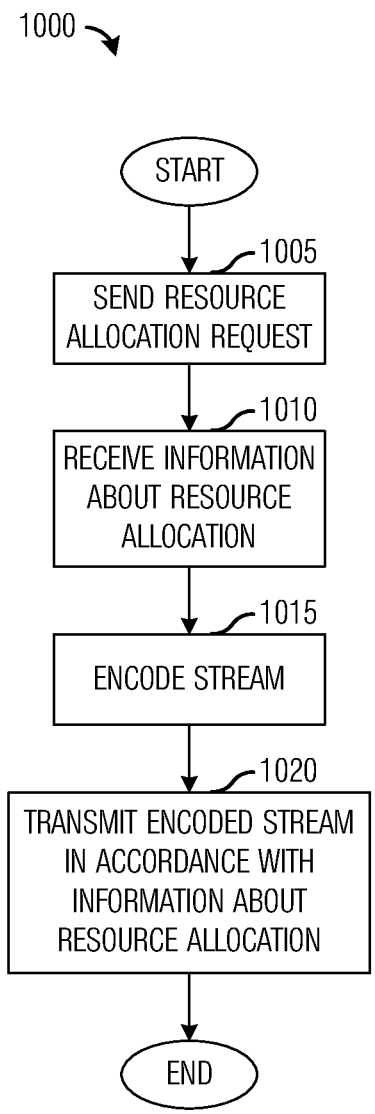
FIG. 10 illustrates a flow diagram of example operations occurring in a transmitting device as the transmitting device transmits a stream at a FTN rate according to example embodiments described herein.

FIG. 10 illustrates a flow diagram of example operations 1000 occurring in a transmitting device as the transmitting device transmits a stream at an FTN rate. Operations 1000 may be indicative of operations occurring in a transmitting device, such as a UE, as the transmitting device transmits a stream at an FTN rate. In such a situation, the UE may transmit its stream to a receiving device, while other UE may also transmit their respective streams to the receiving device. Operations 1000 may be indicative of operations occurring in a transmitting device, such as an eNB or more generally a transmission point that is part of a multiple point transmission to one or more receiving devices, as the transmitting device transmits a stream at an FTN rate Operations 1000 may begin with the transmitting device sending a resource allocation request to the receiving device (e.g., an eNB) (block 1005). The resource allocation request may specify the communications requirements of the individual transmitting devices, such as data bandwidth, frequency of transmission, transmission type and/or priority, and the like. The transmitting device may receive information about a resource allocation scheduled for it by the receiving device (block 1010). It is noted that if the transmitting device is an eNB, the eNB may perform the resource allocation by itself.

The transmitting device may encode the stream (block 1015). The stream may be encoded in accordance with a coding rate, an FTN rate, a modulation and coding scheme level, and the like. The transmitting device may transmit the encoded stream in accordance with the information about the resource allocation (block 1020).

Figure 11:
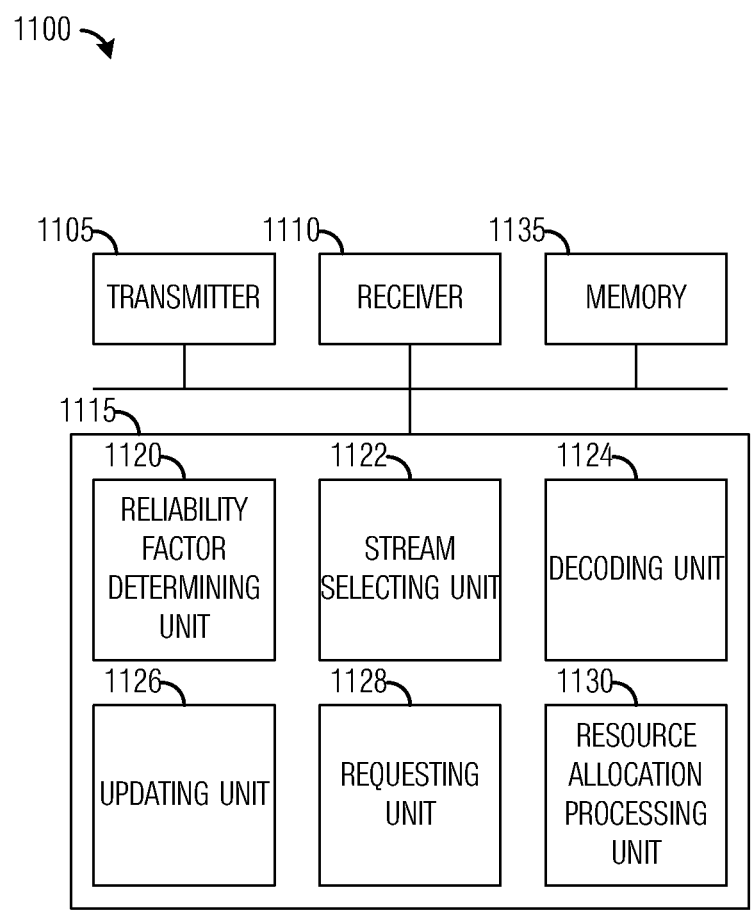
FIG. 11 illustrates an example first communications device according to example embodiments described herein.

FIG. 11 illustrates an example first communications device 1100. Communications device 1100 may be an implementation of a receiving device, such as a communications controller, such as an eNB, a base station, a NodeB, a controller, and the like, or a UE, such as a user, a subscriber, a terminal, a mobile, a mobile station, and the like. Communications device 1100 may be used to implement various ones of the embodiments discussed herein. As shown in FIG. 11, a transmitter 1105 is configured to transmit packets, retransmission requests, and the like. Communications device 1100 also includes a receiver 1110 that is configured to receive packets, data streams, and the like.

A reliability factor determining unit 1120 is configured to determine reliability factors for streams in accordance with conditions, such as SNR, SINR, coding rate, FTN factor, and the like. Reliability factor determining unit 1120 is configured to sort the reliability factors. A stream selecting unit 1122 is configured to select an undecoded stream based on its reliability factor. As an example, stream selecting unit 1122 is configured to select an undecoded stream in accordance with the reliability factor, e.g., the highest reliability factor or a reliability factor that exceeds a predetermined reliability rating. A decoding unit 1124 is configured to decode a stream using a decoding trellis. An updating unit 1126 is configured to update a decoding trellis. Updating unit 1126 is configured to update the decoding trellis utilizing decoded symbols of decoded streams. A requesting unit 1128 is configured to generate a retransmission request if a decoding of a stream is unsuccessful. A resource allocation processing unit 1130 is configured to process a received resource allocation request and assign resources based on the resource allocation. Resource allocation processing unit 1130 is configured to generate information regarding the resource allocation. A memory 1135 is configured to store reliability factors, streams, received signals, decoding trellises, updated decoding trellises, resource allocations, resource allocation requests, information regarding resource allocations, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while reliability factor determining unit 1120, stream selecting unit 1122, decoding unit 1124, updating unit 1126, requesting unit 1128, and resource allocation processing unit 1130 may be software modules executing in a microprocessor (such as processor 1115) or a custom circuit or a custom compiled logic array of a field programmable logic array. Reliability factor determining unit 1120, stream selecting unit 1122, decoding unit 1124, updating unit 1126, requesting unit 1128, and resource allocation processing unit 1130 may be modules stored in memory 1135.

Figure 12:
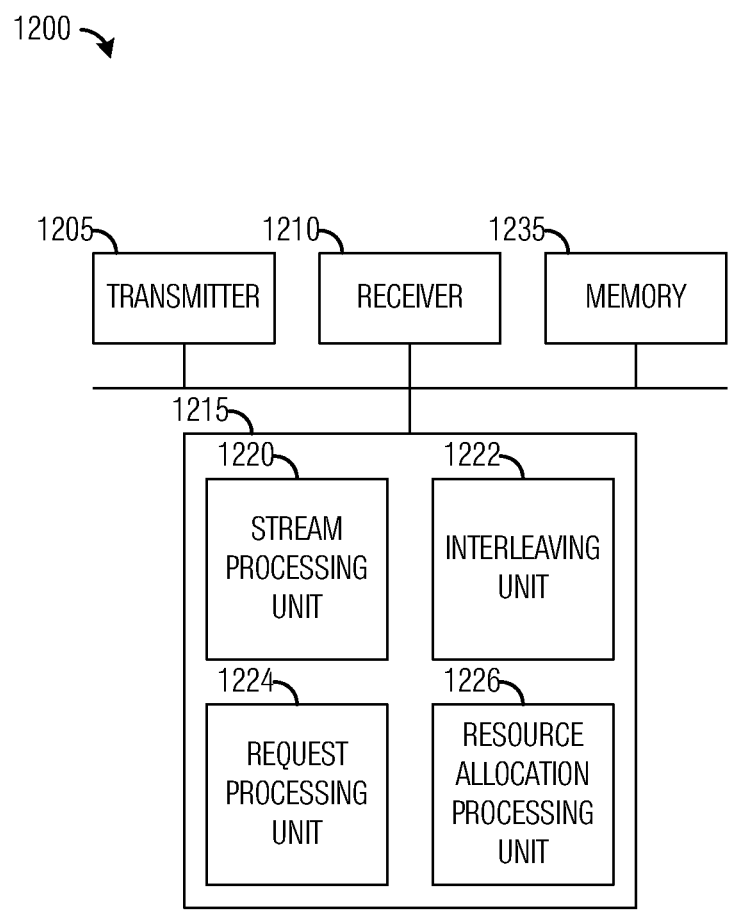
FIG. 12 illustrates an example second communications device according to example embodiments described herein.

FIG. 12 illustrates an example second communications device 1200. Communications device 1200 may be an implementation of a transmitting device, such as a communications controller, such as an eNB, a base station, a NodeB, a controller, and the like, or a UE, such as a user, a subscriber, a terminal, a mobile, a mobile station, and the like. Communications device 1200 may be used to implement various ones of the embodiments discussed herein. As shown in FIG. 12, a transmitter 1205 is configured to transmit packets, blocks, resource allocation requests, and the like. Communications device 1200 also includes a receiver 1210 that is configured to receive packets, information about resource allocations, data streams, and the like.

A stream processing unit 1220 is configured to process received streams. Stream processing unit 1220 is configured to encode received streams. Stream processing unit 1220 is configured to independently encode the received streams. An interleaving unit 1222 is configured to interleave portions of the encoded streams. A request processing unit 1224 is configured to generate a resource allocation request to meet communications needs of communications device 1200. A resource allocation processing unit 1226 is configured to process a received resource allocation request, schedule resources in accordance with the resource allocation request, generate information about the scheduled resource, and the like. Resource allocation processing unit 1226 is configured to schedule resources so that portions of streams for different UEs are interleaved. A memory 1235 is configured to streams, received signals, resource allocations, resource allocation requests, information regarding resource allocations, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while stream processing unit 1220, interleaving unit 1222, request processing unit 1224, and resource allocation processing unit 1226 may be software modules executing in a microprocessor (such as processor 1215) or a custom circuit or a custom compiled logic array of a field programmable logic array. Stream processing unit 1220, interleaving unit 1222, request processing unit 1224, and resource allocation processing unit 1226 may be modules stored in memory 1235.

Although the present disclosure and its advantages have been described in detail, it should be understood that various changes, substitutions and alterations can be made herein without departing from the spirit and scope of the disclosure as defined by the appended claims.

What is claimed is:

1. A method for operating a receiving device, the method comprising:
   receiving, by the receiving device, a plurality of faster than Nyquist (FTN)-rate undecoded data streams having different reliability ratings, in a received transmission;
   determining, by the receiving device, the reliability ratings for the plurality of FTN-rate undecoded data streams in the received transmission;
   selecting, by the receiving device, one of the FTN-rate undecoded data streams in the received transmission in accordance with the determined reliability ratings, thereby producing a selected FTN-rate data stream;
   decoding, by the receiving device, the selected FTN-rate data stream with a decoding trellis, thereby producing a data symbol;
   updating, by the receiving device, the decoding trellis in accordance with the data symbol; and
   repeating, by the receiving device, the selecting, the decoding, and the updating for remaining FTN-rate undecoded data streams in the received transmission.

2. The method of claim 1, wherein selecting one of the FTN-rate undecoded data streams in accordance with the determined reliability ratings includes selecting an FTN-rate undecoded data stream having a highest reliability rating.

3. The method of claim 1, wherein selecting one of the FTN-rate undecoded data streams in accordance with the determined reliability ratings includes selecting an FTN-rate undecoded data stream having a reliability rating in excess of a predetermined reliability threshold.

4. The method of claim 1, wherein determining the reliability ratings comprises receiving the reliability ratings for the FTN-rate undecoded data streams in the received transmission.

5. The method of claim 1, wherein determining the reliability ratings comprises deriving the reliability ratings for the FTN-rate undecoded data streams in the received transmission.

6. The method of claim 5, wherein deriving the reliability rating comprises evaluating each FTN-rate undecoded data stream in accordance with at least one of an FTN factor of the FTN-rate undecoded data stream, a signal to noise ratio of the FTN-rate undecoded data stream, a signal plus interference to noise ratio of the FTN-rate undecoded data stream, a coding rate of the FTN-rate undecoded data stream, or a modulation and coding scheme of the FTN-rate undecoded data stream.

7. The method of claim 6, wherein the reliability rating is a numerical value.

8. The method of claim 6, wherein the reliability rating of the FTN-rate undecoded data stream is high if the signal to noise ratio of the FTN-rate undecoded data stream is high.

9. The method of claim 6, wherein the reliability rating of the FTN-rate undecoded data stream is high if the coding rate of the FTN-rate undecoded data stream is low.

10. The method of claim 6, wherein the reliability rating of the FTN-rate undecoded data stream is high if the FTN factor of the FTN-rate undecoded data stream is high.

11. The method of claim 1, further comprising requesting a retransmission of the received transmission in response to determining that the decoding of the selected FTN-rate data stream is unsuccessful.

12. The method of claim 1, wherein updating the decoding trellis comprises pruning trellis states in accordance with the data symbol.

13. The method of claim 1, wherein the receiving device comprises a user equipment.

14. The method of claim 1, further comprising:
   receiving resource allocation requests from a plurality of user equipments;
   scheduling resource allocations for a subset of the user equipments, wherein the resource allocations are periodic, thereby producing scheduled resources; and
   transmitting information about the scheduled resources to the subset of the user equipments.

15. The method of claim 14, wherein the receiving device comprises an evolved NodeB.

16. A method for operating a transmitting device, the method comprising:
   receiving, by the transmitting device, a first data stream and a second data stream;
   independently encoding, by the transmitting device, each data stream, wherein the independently encoded data streams have different reliability ratings;
   interleaving, by the transmitting device, the independently encoded data streams, thereby producing interleaved data streams; and
   transmitting, by the transmitting device, the interleaved data streams as faster than Nyquist (FTN) rate data streams in a transmitted transmission.

17. The method of claim 16 wherein interleaving the independently encoded data streams comprises periodically interleaving the independently encoded data streams.

18. The method of claim 16, wherein the second data stream comprises one of a pilot sequence or a reference sequence.

19. The method of claim 16, wherein the transmitting device comprises an evolved NodeB.

20. A receiving device comprising:
a receiver configured to receive a plurality of faster than Nyquist (FTN)-rate undecoded data stream having different reliability ratings, in a received transmission; and
a processor operatively coupled to the receiver, the processor configured to:
determine the reliability ratings for the plurality of FTN-rate undecoded data streams in the received transmission,
select one of the FTN-rate undecoded data streams in the received transmission in accordance with the determined reliability ratings, thereby producing a selected FTN-rate data stream,
decode the selected FTN-rate data stream with a decoding trellis, thereby producing a data symbol,
update the decoding trellis in accordance with the data symbol, and
repeat the select, the decode, and the update for remaining FTN-rate undecoded data streams in the received transmission.

21. The receiving device of claim 20, wherein the processor is configured to select an FTN-rate undecoded data stream having a highest reliability rating.

22. The receiving device of claim 20, wherein the processor is configured to select an FTN-rate undecoded data stream having a reliability rating in excess of a predetermined reliability threshold.

23. The receiving device of claim 20, wherein the processor is configured to evaluate each FTN-rate undecoded data stream in accordance with at least one of an FTN factor of the FTN-rate undecoded data stream, a signal to noise ratio of the FTN-rate undecoded data stream, a signal plus interference to noise ratio of the FTN-rate undecoded data stream, a coding rate of the FTN-rate undecoded data stream, or a modulation and coding scheme of the FTN-rate undecoded data stream.

24. The receiving device of claim 20, wherein the receiver is configured to receive the reliability ratings for the FTN-rate undecoded data streams in the received transmission.

25. The receiving device of claim 20, wherein the processor is configured to prune trellis states in accordance with the data symbol.

26. The receiving device of claim 20, wherein the receiving device comprises a user equipment.

27. The receiving device of claim 20, wherein the receiver is configured to receive resource allocation requests from a plurality of user equipments, wherein the processor is configured to schedule resource allocations for a subset of the user equipments, wherein the resource allocations are periodic, thereby producing scheduled resources, and wherein the receiving device further comprises a transmitter operatively coupled to the processor, the transmitter configured to transmit information about the scheduled resources to the subset of the user equipments.

28. The receiving device of claim 27, wherein the receiving device comprises an evolved NodeB.

* * * * *